June 25, 1957 — J. H. MYER — 2,796,967
EGG ALIGNER

Filed Aug. 1, 1955 — 2 Sheets-Sheet 1

INVENTOR.
JON H. MYER
BY
AGENT

June 25, 1957　　　　J. H. MYER　　　　2,796,967
EGG ALIGNER
Filed Aug. 1, 1955　　　　　　　　　2 Sheets-Sheet 2
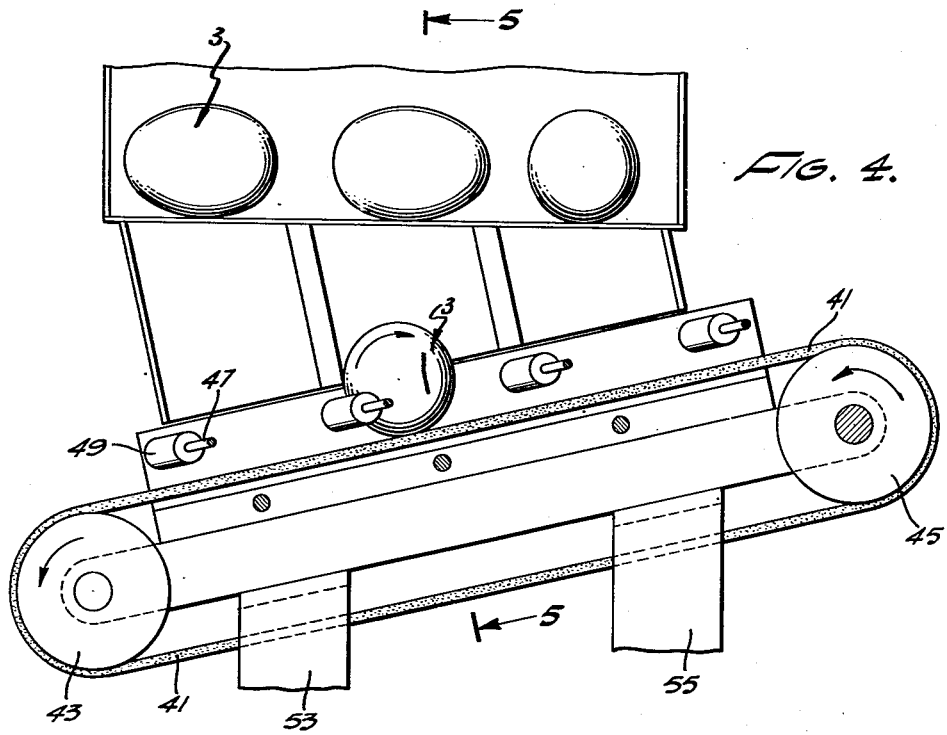
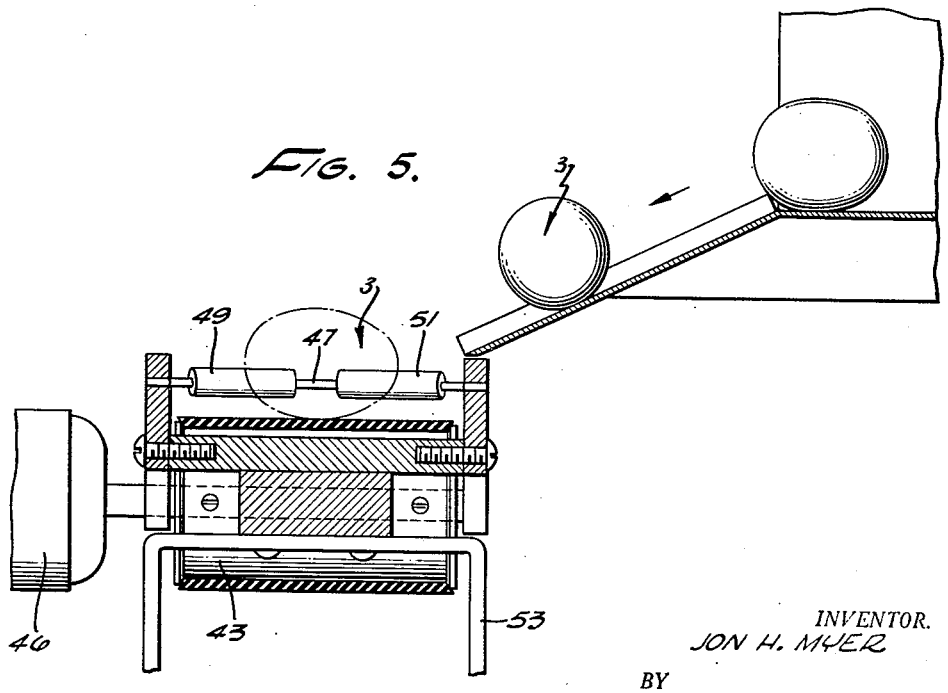
INVENTOR.
JON H. MYER
BY
AGENT

United States Patent Office 2,796,967
Patented June 25, 1957

2,796,967

EGG ALIGNER

Jon H. Myer, Los Angeles, Calif.

Application August 1, 1955, Serial No. 525,565

12 Claims. (Cl. 198—33)

This invention deals with a method and apparatus for aligning ovoid irregular objects, and more particularly to a method and apparatus for aligning eggs.

In commercial practice, before being shipped, freshly laid eggs are collected and then subjected to a number of operations such as inspection, washing, drying, grading and packing. These intermediate operations are generally performed by separate machines on which, and between which, eggs must be transported. Many of these machines must receive and handle eggs in well defined alignment, i. e., with their longest dimensions and their centers in a definite relation to the machine. This alignment of eggs has heretofore been a difficult problem causing breakage of eggs or jamming of machines, and frequently requiring hand operation.

The main difficulties in aligning eggs stem from their fragility, their irregularity of shape, variations of their dissymmetry (i. e., ratio of longest to shortest dimension) and occasional lack of symmetry even around a single axis. A further difficulty is introduced by the variability of their size: chicken eggs in particular vary generally between 1¾ inches and 2¾ inches in length, and 1⅜ inches to 1⅞ inches in width.

One object of this invention is, therefore, to provide a method for aligning eggs and egg-shaped objects.

Another object of this invention is to provide a method of, and apparatus for, aligning eggs which is reliable, simple and independent of the shape and size of the egg, as well as of the orientation in which the egg is received.

Another object of this invention is to provide a method of, and apparatus for, aligning eggs which is gentle in operation and capable of aligning eggs gradually and continuously as well as intermittently.

Still another object of this invention is to provide a method and apparatus for simultaneously aligning and conveying eggs.

A further object of this invention is to provide an apparatus using this method which is simple and dependable, and does not adversely affect the properties of the egg.

Other objects and advantages of this invention will become apparent in the following description in which reference is made to the accompanying illustrations which are by way of example. It is to be expressly understood, however, that the drawings are for the purpose of illustration and description only, and are not intended as a definition of the limits of the invention.

Fig. 4 is a vertical longitudinal section of an alternative embodiment of an apparatus in accordance with the present invention which is a modification of the machine of Fig. 1 suitable for aligning eggs without transporting them; and Fig. 5 is a transverse section taken along line 5—5 of Fig. 4.

According to the present invention the eggs are rolled individually on an inclined plane, being pushed by means of V-shaped members which are essentially parallel to the inclined plane. Under these conditions, no matter what the initial orientation of the egg, it rapidly assumes a stable position in which its longest axis is perpendicular to the direction of motion and its center is substantially in line with the apex of the V-shaped aligning member.

In order to accomplish the purpose of this invention, it is important that the motion of the egg on the inclined surface of the plane be a rolling one. Hence, if the V-shaped aligning member is rigid, the friction upon the plane must be relatively large so that the contact between the egg and the aligning member is sliding. This has the disadvantage that considerable friction may develop, that there may be a tendency for the aligning member to be lifted by the egg, that the surface of the egg may be marred, and that occasionally the motion of the egg may change to a sliding one on the plane while being caught by the aligning member, thus making proper alignment impossible.

These difficulties may be partially overcome by proper choice of materials, such as a covering of rubber for the inclined plane which gives it a high coefficient of friction, and smooth brass which has a low coefficient of friction for the aligning member. A preferred method, however, lies in covering the arms of the V-shaped aligning member with two freely rotatable rollers or sleeves which may be formed from, for example, glass, so that the egg is in rolling contact not only with the inclined plane, but also with the aligning member. Thus, the friction is greatly reduced without interfering with the aligning process, and all the above mentioned difficulties are substantially removed.

Figure 1:
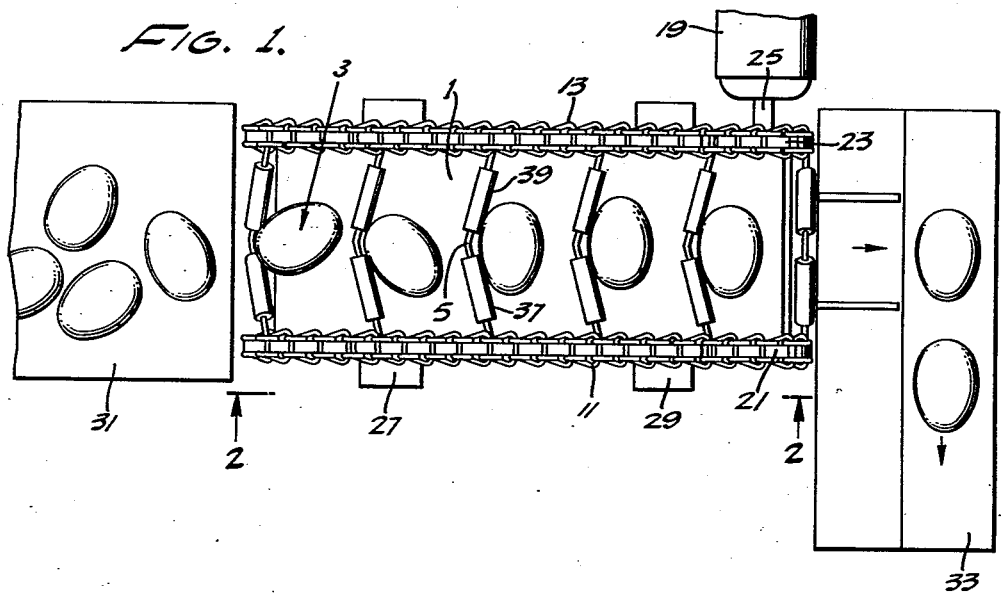
Fig. 1 is a plan view of a presently preferred embodiment of an apparatus in accordance with the present invention, adapted to align and convey eggs by the method of the present invention.
Figure 2:
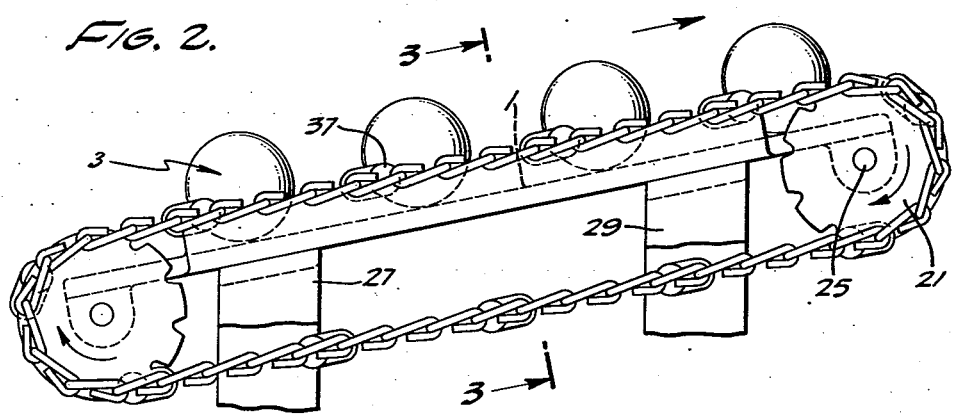
Fig. 2 is a side elevation of the machine of Fig. 1.
Figure 3:
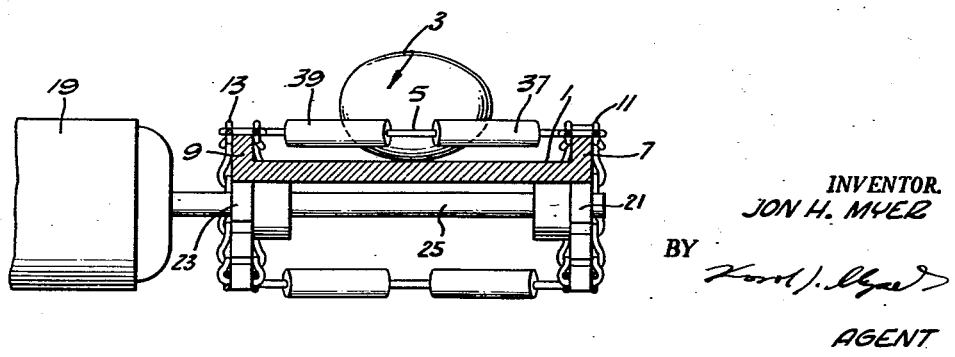
Fig. 3 is a transverse section taken along line 3—3 of Fig. 4.

Referring now to Figs. 1, 2 and 3 of the drawings and particularly to Fig. 1, a presently preferred embodiment of an egg conveying and aligning apparatus of the present invention is shown in Fig. 1. A rubber-covered base member 1 forms an inclined plane upon which eggs 3 roll when propelled by V-shaped aligning members 5. Attached to the plane base member 1 are two tracks 7 and 9 which serve to guide chains 11 and 13. An electric gear reduction motor 19 drives sprockets 21 and 23 by means of a shaft 25. The sprockets 21 and 23 engage the chains 11 and 13 respectively. The V-shaped aligning members 5 are rigidly attached to links of the chains 11 and 13 so that when the chains rest on the tracks 7 and 9 each of the V-shaped aligning members 5 lies in a plane substantially parallel to the base plane 1.

In the case of chicken eggs the distance between the base plane and the V-shaped aligning members should be of the order between ⅝ inch and ⅞ inch, so that the bars are not far below the meridian of the largest eggs and yet not too close to the top of the smallest.

Support brackets 27 and 29 are attached to the apparatus in such a manner as to maintain it in the desired position between the delivering and the receiving mechanisms indicated by conveyors or tracks 31 and 33. The conveyors or tracks 31 and 33 may be any one of the many types well known to the art and form no part of the present invention.

It will be apparent to one skilled in the art that the use of conveyors or tracks is illustrative only and that, according to the application of the apparatus of this invention, various means for delivering eggs to, and receiving aligned eggs from, the apparatus may be utilized.

The angle of the inclined base plane in relation to the horizontal may be varied by adjustment of the length of the supporting brackets 27 and 29. Adjustment of the length of the brackets may be achieved by means well known to the art; however such means are not shown for purposes of clarity in the drawings. This angle of inclination should be such that the eggs will tend to rest between the arms of the V-shaped aligning members 5. It has been found that the angle of inclination is not critical and that satisfactory results are obtained with an angle of inclination between ½ degree and 45 degrees with respect to the horizontal. However, optimum results are achieved when the angle of inclination is within the range of 3 degrees to 25 degrees with respect to the horizontal and in the presently preferred embodiment of the apparatus an angle of the order of 10 degrees is used with excellent results. Angles of less than ½ degree reduce the reliability of the machine, while eggs tend to jam under or jump over the aligning members if the angle exceeds 45 degrees.

In operation, the V-shaped aligning members 5 are moved by the chains 13 and 15 which are driven synchronously by the sprockets 21 and 23 by means of shaft 25 which in turn is powered by motor 19. It has been found that speeds of the order of ½ inch to 5 inches per second are suitable, giving rapid alignment without danger of damage to the egg. The eggs are picked up at the receiving end of the apparatus, which is the lower end as shown to the left in Fig. 1, in a random position, and are rolled up the inclined base plane 1 by aligning members 5 which orient them with their long axis perpendicular to the direction of motion, and locate them in the center of base plane 1. Upon reaching the upper end of the inclined base plane 1 they are pushed onto a conveyor or track 33 which receives the aligned eggs in this illustrative application of the present invention.

The preferred embodiment of the V-shaped aligning member is shown in Fig. 1 and Fig. 3. The obtuse included angle between the arms of the V-shaped aligning member is of the order of 145 degrees. Satisfactory results are obtained, however, when the included angle between the arms of the V-shaped members is within the range of the order of 100 degrees to 170 degrees. The chains 11 and 13 carry the V-shaped bar 5 which in turn carries freely rotatable rollers or sleeves 37 and 39, which are formed of glass in this embodiment. In operation, the chain motion presses rollers 37 and 39 against eggs 3 causing the latter to roll on inclined base plane 1. This rolling motion of the egg is transmitted to rollers 37 and 39 which rotate on the bar 5 freely and independently at velocities which may be different from each other. In this manner the egg is subject only to rolling contact at all points.

The foregoing illustrates the application of the principle of this invention to the combined conveyance and alignment of eggs. Referring now to Fig. 4 and Fig. 5 a presently preferred embodiment of an apparatus in accordance with the principles of the present invention for aligning eggs without conveying them is shown.

In this application the alignment of the eggs is accomplished as described hereinbefore by the relative motion of the V-shaped aligning members with respect to an inclined base plane. However, in this embodiment where conveyance of the eggs is not desired, the relative motion is achieved by means of a moving endless belt 41 which forms an inclined base plane with respect to the V-shaped aligning members 47 which are stationarily positioned with respect to the apparatus. Thus, as in the embodiment of Figs. 1, 2 and 3 described hereinbefore, relative motion is obtained between the V-shaped aligning members and the inclined plane upon which the eggs rest. Therefore, it will be apparent to one skilled in the art that the principle of alignment of the embodiment of Figs. 4 and 5 corresponds to that described hereinbefore in conjunction with the apparatus of Figs. 1, 2 and 3. In the alternative embodiment of Figs. 4 and 5 the inclined base plane comprises a moving endless belt 41 supported by rollers 43 and 45, one of which is driven by a motor 46. The V-shaped aligning bars 47 are held stationary. Rollers 49 and 51 are freely and independently rotatable on the arms of the V-shaped bars 47. In this embodiment the rollers are again formed of glass, for example, and the included obtuse angle is of the order of 145 degrees. As described hereinbefore, however, many materials having a low coefficient of friction may be used and an included angle between the arms which is within the range of the order of 100 degrees to 170 degrees gives satisfactory results. Support brackets 53 and 55 hold these parts in fixed positions and may be varied in length, as described hereinbefore, to vary the angle of inclination of the endless belt 41. As described in conjunction with the apparatus of Figs. 1, 2 and 3 the angle of the inclination may be varied from ½ degree to 45 degrees for satisfactory results, although an angle of inclination within the range of the order of 3 degrees to 25 degrees with respect to the horizontal is preferred for optimum results. In this embodiment an angle of inclination of the order of 10 degrees is again used.

In operation, an egg is placed in random orientation on the belt 41, is rotated against the rollers 47 and 49 and rapidly oriented with its long axis perpendicular to the direction of movement of the belt which is from right to left of Fig. 4 as indicated. This aligning device may thus be readily incorporated in any machine requiring oriented eggs in a fixed position.

While the foregoing embodiments illustrate clearly the principle of this invention, its incorporation into egg handling machines, and many modifications which do not depart from its spirit, will be easily apparent to one skilled in the art.

What is claimed is:

1. A machine for aligning eggs which comprises: an inclined plane, at least one obtuse-angle V-shaped aligning member above said plane and oriented so that the bisector of said V-shaped aligning member is substantially parallel to the slope of said plane and directed upward, means for producing a unidirectional relative motion between said plane and said member in the direction of said bisector and adapted to impart a rolling motion to an egg supported by said plane and said aligning member.

2. The machine of claim 1 wherein the obtuse included angle between the arms of said V-shaped aligning member is between 100 degrees and 170 degrees.

3. The machine of claim 1 wherein each of the arms of said V-shaped aligning member is covered by freely and independently rotatable cylindrical rollers or sleeves.

4. The machine of claim 1 wherein the angle of inclination of said inclined plane is between ½ degrees and 45 degrees.

5. The machine of claim 1 wherein said rolling motion is generated by the movement of said aligning member pushing the egg up said inclined plane.

6. The machine of claim 1 wherein said rolling motion is generated by the movement of said inclined plane pushing the egg against said aligning member.

7. A machine for aligning eggs which comprises: an inclined plane having a width substantially greater than the largest dimension of said eggs; at least one V-shaped aligning member spaced above and substantially parallel to said inclined plane by a distance substantially less than the smallest width of said eggs; and means for maintaining said V-shaped aligning member at said distance from said plane while moving said V-shaped aligning member parallel to said plane in the direction of the bisector of the opening of said V-shaped aligning member, and upward on said inclined plane.

8. The machine of claim 7 wherein said V-shaped aligning members are substantially cylindrical bars and the means for moving said V-shaped aligning members are chains attached to the ends of said cylindrical bars.

9. The machine of claim 7 wherein said V-shaped aligning member consists of two freely and independently rotatable cylindrical rollers or sleeves.

10. A machine for aligning eggs which comprises: an inclined plane having a width substantially greater than the largest dimension of said eggs; at least one V-shaped aligning member spaced above and substantially parallel to said inclined plane by a distance substantially less than the smallest width of said eggs; and means for maintaining said V-shaped aligning member at said distance from said plane while moving said plane in the direction of the bisector of the opening of said V-shaped aligning member.

11. The machine of claim 10 wherein said plane is formed by an endless moving belt.

12. Each and every novel feature and combination of novel features present in or possessed by the methods and apparatuses herein disclosed.

References Cited in the file of this patent
UNITED STATES PATENTS

| | | |
|---|---|---|
| 2,296,645 | Marsden | Sept. 22, 1942 |
| 2,298,614 | Carroll | Oct. 13, 1942 |
| 2,704,146 | Reck | Mar. 15, 1955 |
| 2,735,465 | Kellogg | Feb. 21, 1956 |